(12) United States Patent
Kim et al.

(10) Patent No.: US 7,869,840 B2
(45) Date of Patent: Jan. 11, 2011

(54) SEMI-AUTOMATIC SWING DEVICE FOR SWING-TYPE PORTABLE TERMINAL

(75) Inventors: Jae-Shik Kim, Seongnam-si (KR); Yong-Jae Kim, Suwon-si (KR); Hong-Bae Kim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 594 days.

(21) Appl. No.: 11/866,170

(22) Filed: Oct. 2, 2007

(65) Prior Publication Data
US 2008/0081591 A1    Apr. 3, 2008

(30) Foreign Application Priority Data
Oct. 2, 2006   (KR) ..................... 10-2006-0097094

(51) Int. Cl.
*H04B 1/38* (2006.01)
*H04M 1/00* (2006.01)

(52) U.S. Cl. .................. 455/575.1; 455/90.3; 455/575.3

(58) Field of Classification Search ................. 455/566, 455/575.1, 575.3, 575.4, 347–349, 90.3
See application file for complete search history.

(56) References Cited

U.S. PATENT DOCUMENTS

| | | | |
|---|---|---|---|
| 6,850,784 B2 * | 2/2005 | SanGiovanni | 455/575.1 |
| 7,055,219 B2 * | 6/2006 | Shiba | 16/367 |
| 7,159,833 B2 * | 1/2007 | Kato | 248/349.1 |
| 7,376,450 B2 * | 5/2008 | Chen | 455/575.4 |
| 7,492,893 B2 * | 2/2009 | Ahn et al. | 379/433.13 |
| 7,499,737 B2 * | 3/2009 | Mizuta et al. | 455/575.3 |
| 7,546,150 B2 * | 6/2009 | Makino | 455/575.1 |
| 7,567,830 B2 * | 7/2009 | Hur | 455/575.4 |
| 7,583,317 B2 * | 9/2009 | Kinemura et al. | 348/376 |
| 7,671,841 B2 * | 3/2010 | Lee et al. | 345/158 |
| 2004/0228075 A1 * | 11/2004 | Moriguchi et al. | 361/680 |
| 2007/0293283 A1 * | 12/2007 | Inubushi et al. | 455/575.1 |

FOREIGN PATENT DOCUMENTS

| | | |
|---|---|---|
| KR | 1020050097455 | 10/2005 |
| KR | 1020060033298 | 4/2006 |
| KR | 20-0416846 | 5/2006 |

* cited by examiner

*Primary Examiner*—Simon D Nguyen
(74) *Attorney, Agent, or Firm*—The Farrell Law Firm, LLP

(57) ABSTRACT

A semi-automatic swing device for a swing-type portable terminal. The semi-automatic swing device includes a first member; a second member for semi-automatically performing first and second swing operations along a desired trajectory on the first member, while facing the first member; guide means having a first guide portion formed in the first member and a second guide portion spaced apart from the first guide portion, for determining a direction of the swing operations; a driving source installed in the first guide portion, for allowing the second member to semi-automatically perform the swing operations; and first and second coupling members mounted on the second member and coupled with the first and second guide portions, respectively, the first and second coupling members moving along the first and second guide members and restricting the first and second members while the first and second members face each other.

15 Claims, 9 Drawing Sheets

SEMI-AUTOMATIC SWING DEVICE FOR SWING-TYPE PORTABLE TERMINAL

PRIORITY

This application claims priority to an application filed with the Korean Intellectual Property Office on Oct. 2, 2006 and assigned Serial No. 2006-97094, the contents of which are incorporated herein by reference.

BACKGROUND OF THE INVENTION

1. Field of the Invention

The present invention relates to a portable terminal including Digital Multimedia Broadcasting phones (DMB phone), game phones, chatting phones, camera phones, MP3 phones, cellular phones, Personal Communication System phones (PCS phones), Personal Digital Assistants (PDAs) and Hand Held Phones (HHP phones), and more particularly to a semi-automatic swing device for a swing-type portable terminal.

2. Description of the Related Art

In general, the term "portable terminal" refers to an electronic device that a user can carry with him/her while communicating with another user wirelessly. The portable terminal can perform wireless communication, for example a voice communication, a message transmission, a file transmission, and an image communication, as well as taking a picture. In addition, the portable terminal plays the role of a personal assistant to manage phone numbers and personal schedules.

On the other hand, in consideration of portability, design of such a portable terminal has tended not only toward compactness, slimness and lightness, but also toward providing multimedia capabilities to allow the user to pursue a wider variety of functions, for example, entertainment contents including games. In particular, future portable terminals will not only be multi-functional while still being compact and light, but will also be modified to be suitable for functioning in a multimedia environment including image communication, game, internet access, and camera functions, as well as for merely carrying out voice communication.

Conventional portable terminals may be classified into various types according to their appearance, such as bar-type portable terminals and folder-type portable terminals. The bar-type portable terminal has a single housing shaped like a bar, in which data input/output units, antenna, a transmitter, and a receiver, etc. are disposed. The folder-type portable terminal has a folder coupled to a single bar-shaped housing by a hinge unit so that the folder can be folded to or unfolded from the housing. Further, portable terminals may be classified as swing-type terminals according to ways of opening and closing the terminals. In the swing-type portable terminal, two housings are coupled while facing each other in a manner that one housing swings to be opened or closed relative to the other.

Korean Patent Application No. 2005-2330, filed by the present applicant, discloses a conventional swing device for a swing-type portable terminal.

However, the swing device disclosed in the above-mentioned Korean Patent Application No. 2005-2330 has a great number of parts, resulting in decreased assembling capacity. Therefore, there is disadvantage of high manufacturing costs. Although the portable terminal has tended toward slimness, the thickness of the swing device has not been reduced yet. Accordingly, it is difficult to improve the slimness of the swing device and the portable terminal employing the swing device.

SUMMARY OF THE INVENTION

Accordingly, the present invention has been made to solve the above-mentioned problems occurring in the prior art, and it is an aspect of the present invention to provide a semi-automatic swing device for a swing-type portable terminal, which can be advantageous slimming the portable terminal.

It is another aspect of the present invention to provide a semi-automatic swing device for a portable terminal, in which the number of parts can be reduced so as to improve assembly of the portable terminal.

It is still another aspect of the present invention to provide a semi-automatic swing device for a portable terminal, which has an overall simple structure.

It is still another aspect of the present invention to provide a semi-automatic swing device for a portable terminal, which can semi-automatically open and close the portable terminal easily.

It is still another aspect of the present invention to provide a semi-automatic swing device for a portable terminal, which can allow a display unit to rotate from a portrait mode to a landscape mode, so that a user can watch various moving pictures with convenience in a DMB mode or a TV mode relating to modes of watching various moving pictures.

It is still another aspect of the present invention to provide a semi-automatic swing device for a portable terminal, by which manufacturing costs can be reduced.

In order to accomplish these aspects of the present invention, according to an embodiment of the present invention, there is provided a semi-automatic swing device for swinging a swing housing on a body housing of a swing-type portable terminal including the body housing and the swing housing, the semi-automatic swing device comprising: a first member; a second member for semi-automatically performing first and second swing operations along a desired trajectory on the first member, while facing the first member; guide means having a first guide portion formed in the first member and a second guide portion spaced apart from the first guide portion, for determining a direction of the first and second swing operations; a driving source installed in the first guide portion, for allowing the second member to semi-automatically perform the first and second swing operations; and first and second coupling members mounted on the second member and coupled with the first and second guide portions, respectively, the first and second coupling members moving along the first and second guide members, respectively, and restricting the first and second members while the first and second members face each other.

In order to accomplish these aspects of the present invention, according to another embodiment of the present invention, there is provided a semi-automatic swing device for swinging a swing housing on a body housing of a swing-type portable terminal including the body housing and the swing housing, the semi-automatic swing device comprising: a first member; a second member for semi-automatically performing first and second swing operations along a desired trajectory on the first member; first and second guide portions formed in the first member, for determining a direction of the swing operations of the second member; first and second coupling members mounted on the second member and coupled with the first and second guide portions, respectively, so as to restrict the first and second members to perform the first and second swing operations; a driving source installed in the first guide portion while making close contact with the first coupling member, for rendering the first and second swing operations semi-automatic; and a linear connector for integrally connecting the first and second coupling members, wherein the linear connector is aligned perpendicularly to the first guide portion before the first and second swing operations, while being arranged in a longitudinal direction of the first guide member during the first and second swing operations.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, the preferred embodiment of the present invention will be described in detail with reference to the accompanying drawings. In the following description of the present invention, a detailed description of known functions and configurations incorporated herein is omitted for clarity and conciseness.

Figure 1:
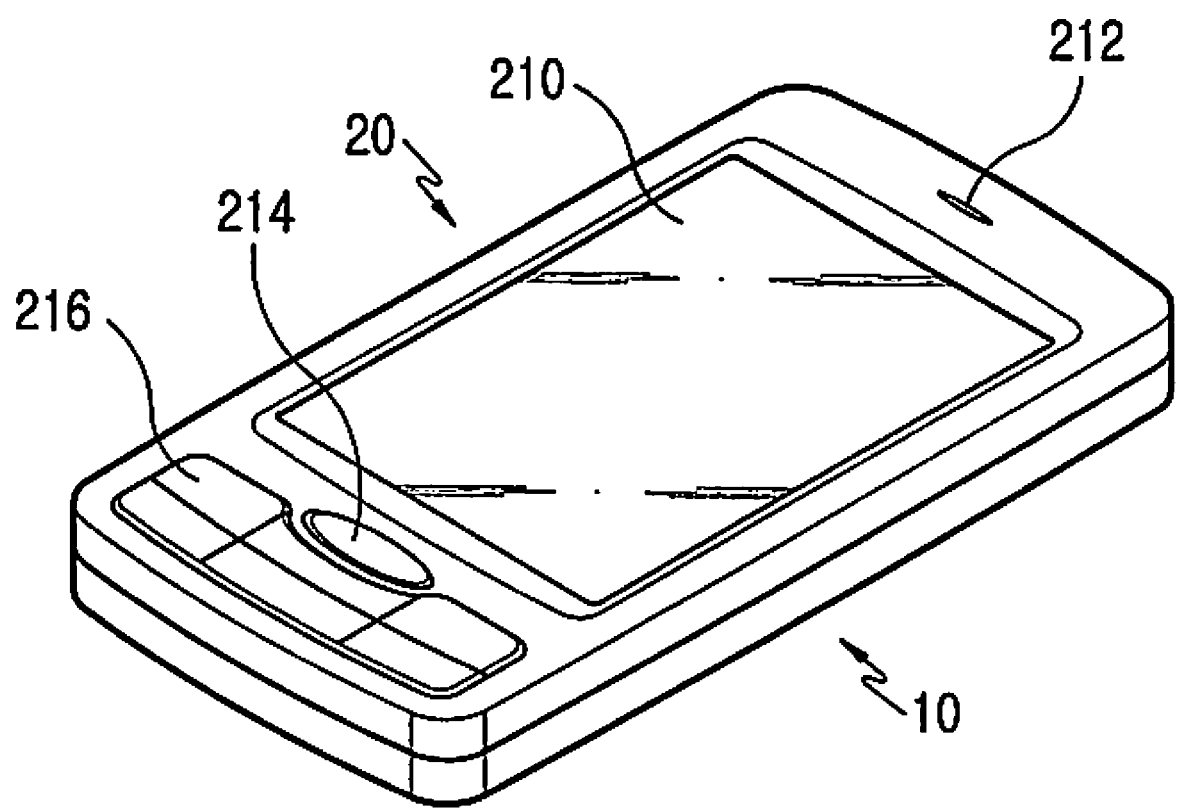
FIG. 1 is a perspective view showing a portable terminal employing a swing device according to the present invention.
Figure 2:
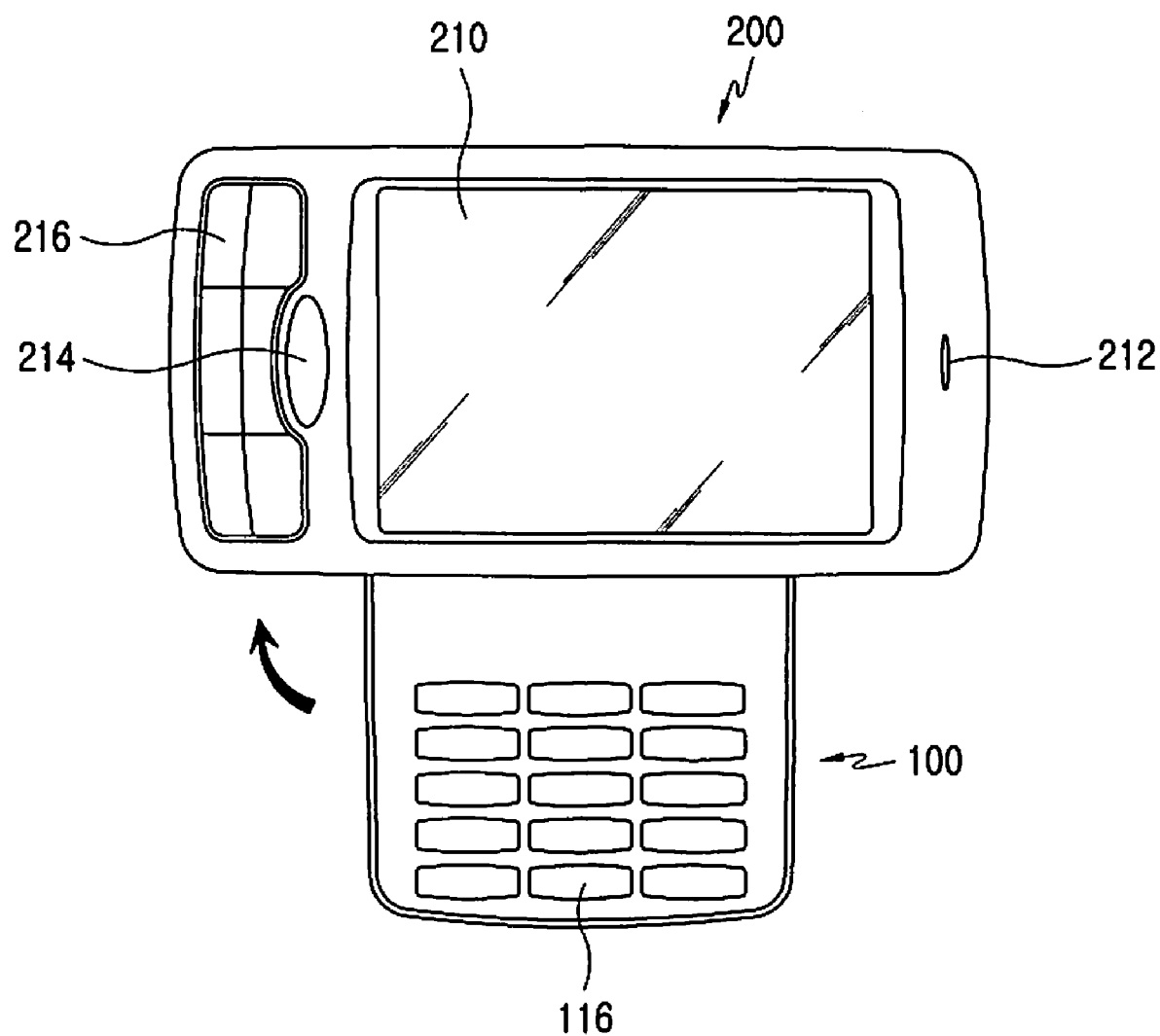
FIG. 2 is a perspective view showing the portable terminal employing the swing device according to the present invention, in which a swing housing rotates at an angle of 90 degrees.
Figure 3:
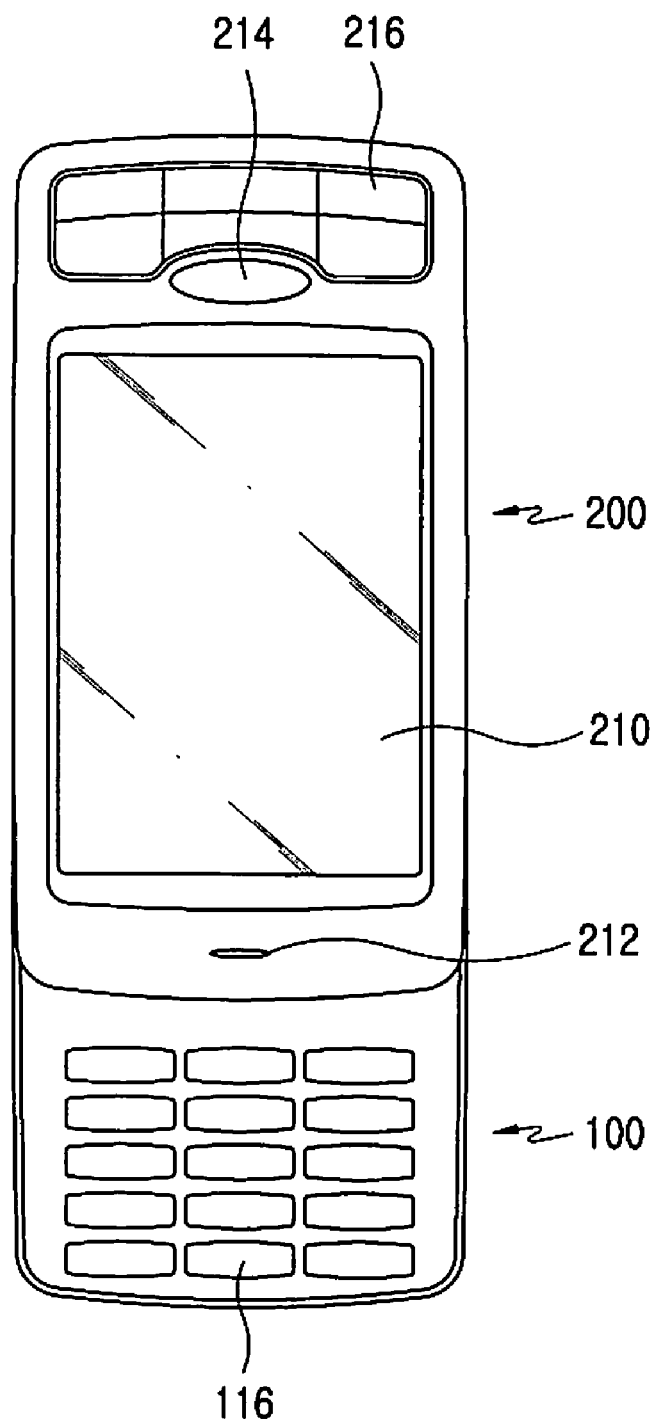
FIG. 3 is a perspective view showing the portable terminal employing the swing device according to the present invention, in which the swing housing rotates at an angle of 180 degrees.

First, the configuration of the portable communication terminal employing a swing device according to the present invention will be described with reference to FIGS. 1 to 3. As shown in FIGS. 1 to 3, the portable terminal according to the present invention is a swing type, and includes a body housing 10, a swing housing 20, and a swing device 30 (see FIG. 4) for allowing the swing housing 20 to swing with respect to the body housing 10. The swing device 30 is manually activated.

The swing housing 20 performs the first swing operation along a desired trajectory while facing the body housing 10, and in turn entirely covers an upper region of the body housing 10. As a result, the swing housing 20 is in a landscape mode. Then, the swing housing 20 continuously performs the second swing operation, and is aligned again on the body housing 10 in a portrait mode. The swing housing 20 stays rotated at an angle of 180 degrees after the second swing operation thereof. FIG. 2 shows the swing housing 20 arranged on the body housing 10 in the landscape mode, and FIG. 3 shows the swing housing 10 arranged on the body housing 10 in the portrait mode, in which the swing housing 10 has rotated at an angle of 180 degrees.

The body housing 10 includes the first keypad unit comprising a plurality of first keys 116, which are arranged on an upper surface of the body housing 10. The first keys 116 are arranged at a lower region on the upper surface of the body housing 10. In an upper region on the upper surface of the body housing, a swing device is arranged. On the upper surface of the body housing 10, the lower region refers to a region in which the first keys 116 are arranged, and the upper region refers to a region in which the swing device instead of the first keys 116 is mounted. As shown in FIGS. 1 to 3, the upper region on the upper surface of the body housing 10 is a region that is always closed. However, the lower region on the upper surface of the body housing is a region that is sometimes open as shown in FIG. 2 or 3.

The swing housing 20 has a display unit 210 disposed on the upper surface of the swing housing 20. Further, the swing housing 20 includes at least one speaker unit 212 or 214, and the second keypad unit consisting of a plurality of second keys 216, which are arranged on the upper surface of the swing housing 20. The speaker unit includes the first and second speaker units 212 and 214, which are arranged at both sides of the display unit 210 so as to provide stereo sound. Where the display unit 210 stays after the first swing operation, shown in FIG. 1, it is referred to as a portrait mode. On the other hand, where the display unit 210 stays after the second swing operation, shown in FIG. 2, it is referred to as the landscape mode. It is advantageous to watch moving pictures when the display unit 210 is arranged in the landscape mode as shown in FIG. 2.

In FIG. 2, the swing housing 20 is at a second position after swinging for an angle of 90 degrees in a clockwise direction from a first position shown in FIG. 1. In FIG. 3, the swing housing 20 is at a third position after swinging for another angle of 90 degrees in the clockwise direction from the second position. The swinging of the swing housing 20 back and forth between the first and second positions refers to the first swing operation. The swinging of the swing housing 20 back and forth between the second and third positions refers to the second swing operation. In addition, the swing housing 20 has the upper region and the lower region reversed in the longitudinal direction of the body housing 10 after the second swing operation.

In FIG. 2, the display unit 210 stays in the landscape mode, and allows a user to watch the moving pictures with convenience. In FIG. 3, the first and second keypads including the first and second keys 116 and 216, respectively, are arranged near both ends of the display unit 210, so that the user can conveniently operate keys with both hands in a game mode.

Hereinafter, the configuration of the swing device 30 according to the present invention will be described with reference to FIGS. 4 to 9. As shown in FIGS. 4 to 9, the swing device 30 according to the present invention is a slim and semi-automatic swing device, and includes the first member 31, the second member 32, guide means having the first and second guide portions 33 and 34, a driving source 36 providing opening and closing force semi-automatically, and coupling means having the first and second coupling members 320 and 321. The first member 31 may be attached to the upper surface of the body housing, for example by means of screws (not shown), or may be the upper surface of the body housing itself. The second member 32 may be attached to the lower surface of the swing housing also, for example, by means of screws (not shown), or may be the lower surface of the swing housing itself. When the upper surface of the body housing and the lower surface of the swing housing are used as the first member 31 and the second member 32, respectively, it is very advantageous for the slimness of the portable terminal.

In particularly, the swing device according to the present invention 30 includes the first member 31, the second member 32 for performing the first and second swing operations semi-automatically along the desired trajectory while continuing to face the first member 31, the guide means having the first guide portion 33 formed in the first member 31 and the second guide portion 34 formed to be spaced apart from the first guide portion 33, for determining a direction of the first and second swing operations, the driving source 36 mounted in the first guide portion 33 for semi-automatically providing the first and second swing operations, and first and second coupling members 320 and 321 mounted on the second member 32 and coupled with the first and second guide portions 33 and 34 so as to move along the first and second guide portions 33 and 34, respectively, while restricting the first and second members 31 and 32 so that the first and second members 31 and 32 face each other.

Figure 4:
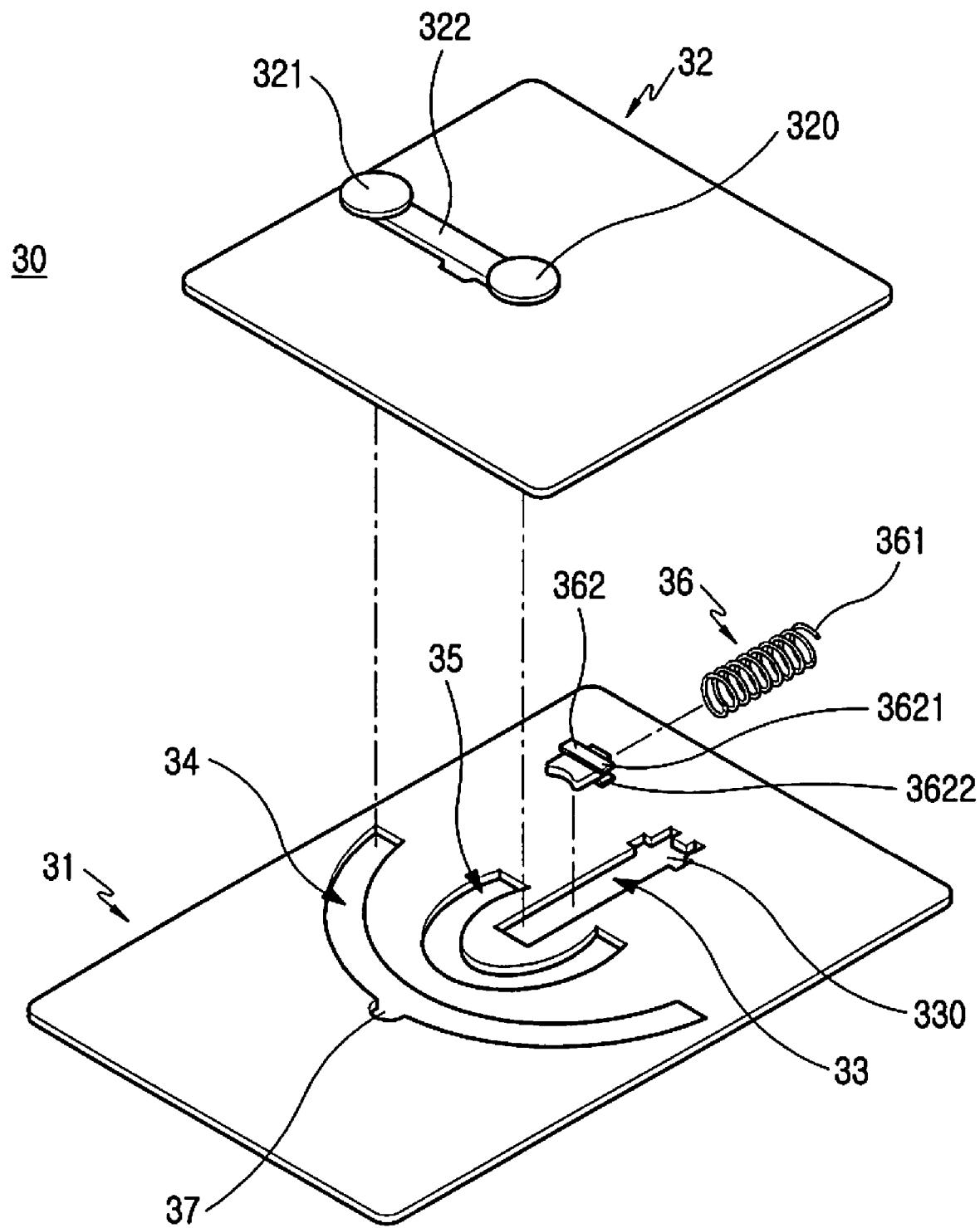
FIG. 4 is an exploded perspective view showing the swing device according to the present invention.

As shown in FIG. 4, the first guide portion 33 is linearly formed, and the second guide portion 34 is curvedly formed. Further, the first and second guide portion 33 and 34 are formed to be openings, i.e. first and second guide openings, respectively. The first and second coupling members 320 and 321 extend through and couple with the first and second guide openings 33 and 34, respectively. The first guide portion 33 has a letter "I" shape, and the second guide portion 34 has a letter "C" shape. Specifically, the second guide portion 34 has the letter "C" shape, which is open toward the driving source 36. The driving source 36 is inserted in the first linear guide portion 33 and linearly coupled with the first member 31.

Figure 7:
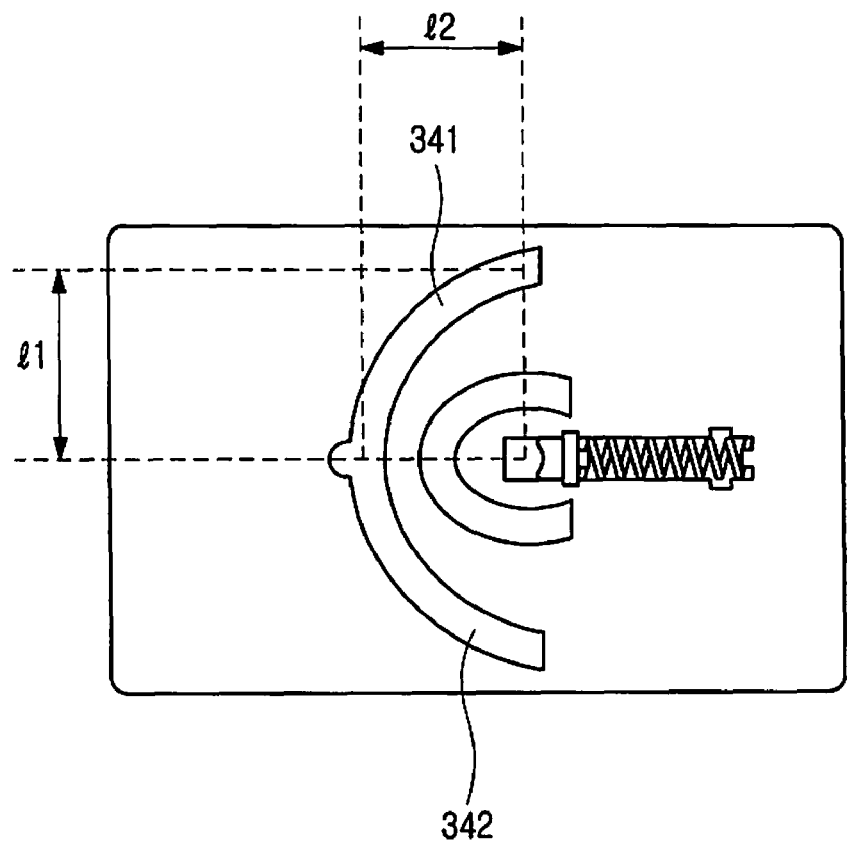
FIG. 7 is a perspective view showing the swing device according to the present invention, in which the first member and the driving source are assembled with the swing device.

As shown in FIGS. 4 and 7, the second guide portion 34 includes the first curved guide portion 341 for the first swing operation, and the second curved guide portion 342 for the second swing operation. The first and second curved guide portions 341 and 342 are symmetric to each other with respect to a longitudinal axis of the first guide portion 33. The first and second curved guide portions 340 and 341 are smoothly curved. Specifically, the second guide portion 34 has a semi-circular stop opening 37, described below, formed at a junction of the first and second curved guide portions 341 and 342.

In the meantime, the second guide portion 34 further has a stop portion for stopping the second member 32 during the first and second swing operations. The stop portion includes the semi-circular stop opening 37 formed to receive the second coupling member 321. The stop opening 37 has a semi-circular shape corresponding to a circumference of the second coupling member 321.

The operation of the stop portion will be described with reference to FIGS. 4 and 7. The driving source 36 applies force to the second coupling member 321 in order to insert the second coupling member 321 into the stop opening 37. When the second coupling member 321 is inserted in the stop opening 37, the driving source 36 applies stopping force, which is greater than the driving force of the second coupling member 321 during the first and second swing operations, to the second coupling member 321. However, the stopping force of the driving source 36 is smaller than the force which is manually applied to the second coupling member 321 by a user in order to perform the first and second swing operations of the second member 32, and thereby it is possible to manually perform the first and second swing operations of the second member 32.

As shown in FIG. 7, the guide means is formed such that a distance 12 from a near end of the first guide portion 33 to the junction of the first and second curved guide openings 341 and 342 is less than a distance 11 from the longitudinal axis of the first guide portion 33 to each of distal ends of the first and second curved guide openings 341 and 342. This causes the driving source to apply the swing force to the second member semi-automatically. According to this structure, the first coupling member 320 can move in the first guide portion 33 while being subjected to the force from the driving source 36.

Figure 5:
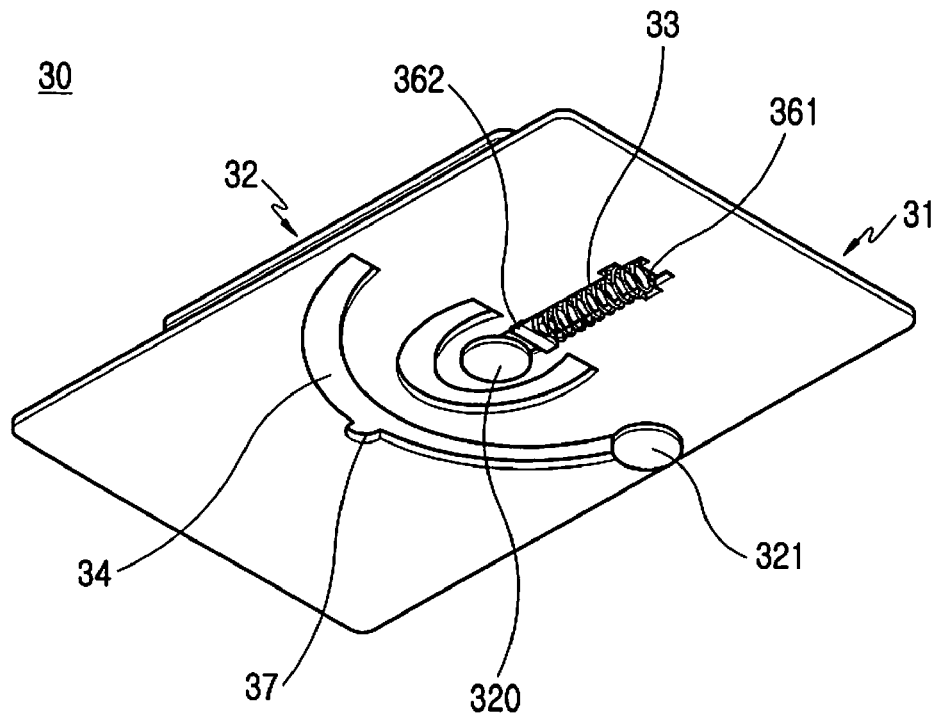
FIG. 5 is a perspective view showing the swing device which is assembled, according to the present invention.
Figure 6:
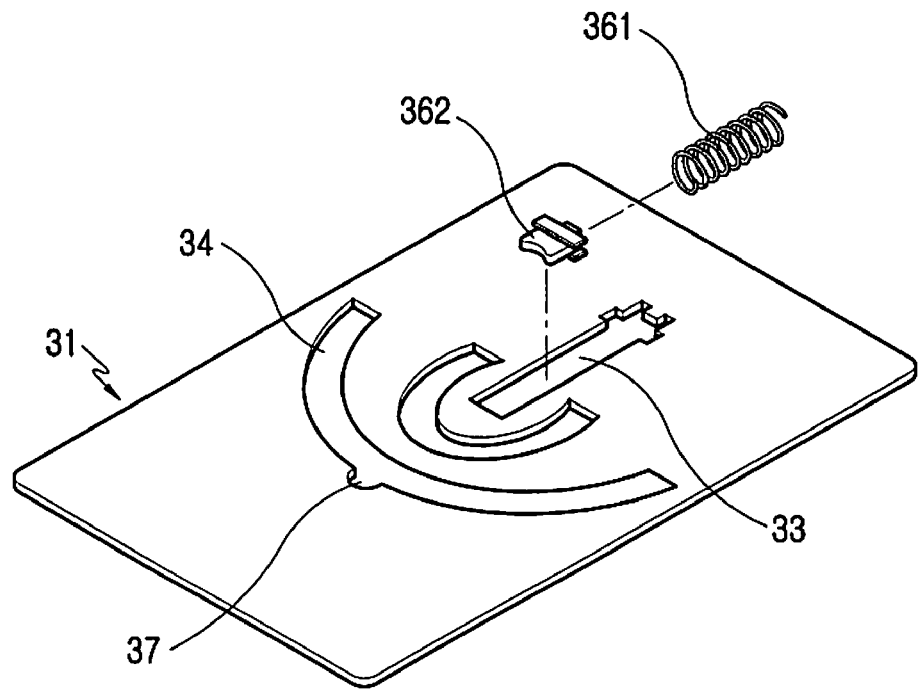
FIG. 6 is an exploded perspective view showing the swing device according to the present invention, in which a first member and a driving source are separated from the swing device.

As shown in FIGS. 4 to 6, the driving source 36 includes an elastic body 361 installed in the first guide portion 33 and semi-automatically applying force, and a movable member 362 coupled with the elastic body 361 and reciprocating in the first guide portion 33 to guide the elastic body 361 applying the force. The movable member 362 is formed with a pair of guide protrusions 3621 and 3622 and slides along the longitudinal axis of the first guide portion 33. The first guide portion 33 has at its far end an assembling opening to receive the movable member 362, so that the movable member 362 can be assembled with the first guide portion 33.

Further, an auxiliary opening 35 is formed between the first and second guide portions 33 and 34. The auxiliary opening 35 is spaced apart from the second guide portion 34 and performs independent functions. The auxiliary opening 35 also has a shape, i.e. letter "C" shape, similar to the second guide portion 34. The auxiliary opening 35 provides elasticity.

Figure 8:
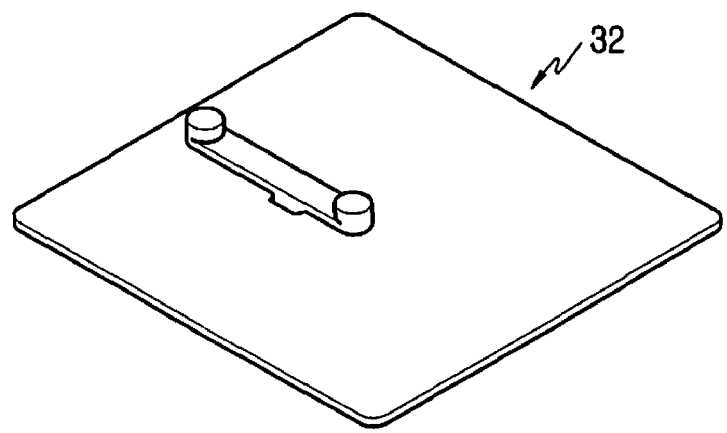
FIG. 8 is a perspective view showing a second member for the swing device according to the present invention.
Figure 9:
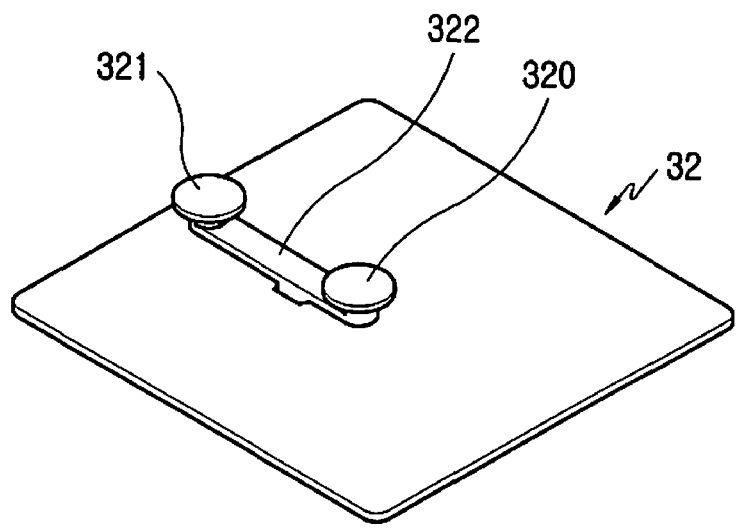
FIG. 9 is a perspective view showing the second member for the swing device according to the present invention, in which the coupling means is assembled with the second member.

As shown in FIGS. 8 and 9, the second member 32 is provided with the first and second coupling members 320 and 321, both coupled with the second member 32. FIG. 8 shows the second member 32 before the first and second coupling members 320 and 321 are coupled with the second member 32, and FIG. 9 shows the second member 32 after the first and second coupling members 320 and 321 are coupled with the second members 32. Of course, the first and second coupling members 320 and 321 are assembled with the first member 31. A linear connection member 322 extends between the first and second coupling members 320 and 321. The linear connection member 322 is located perpendicular to the first guide portion 33 before the first and second swing operations, while being aligned in the longitudinal direction of the first guide portion 33 after the first and second swing operations.

Hereinafter, the operation of the swing device according to the present invention will be sequentially described with reference to FIGS. 10A to 10E.

Figure 10A:
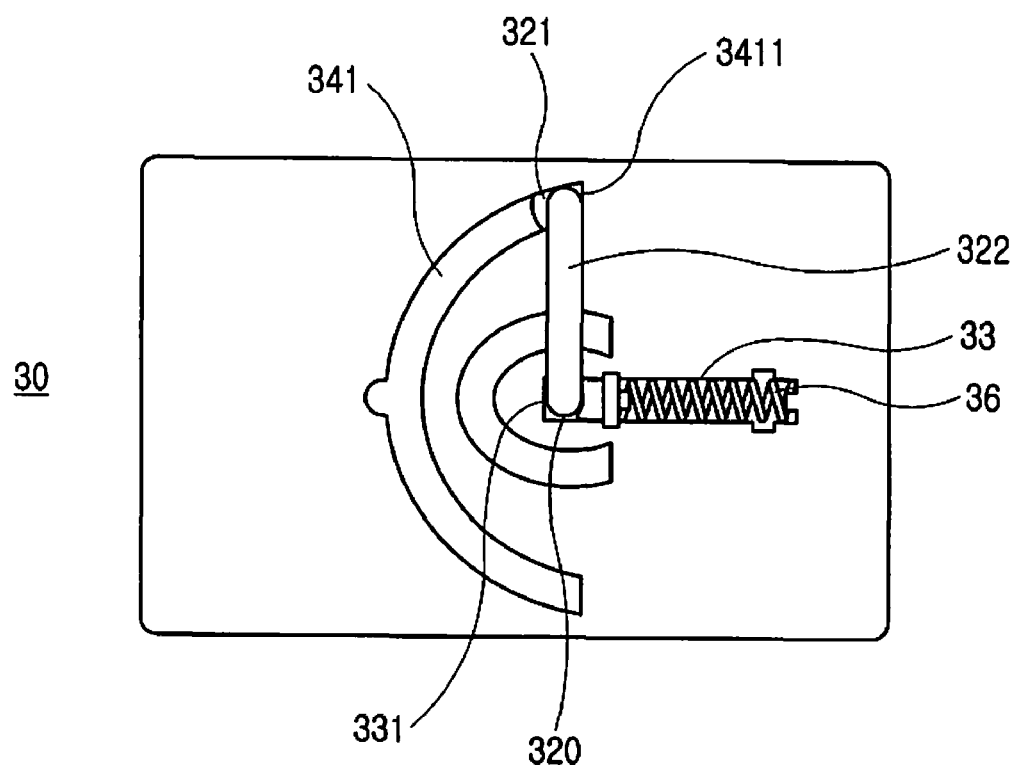
FIG. 10A is a view illustrating the operation of the swing device according to the present invention, in which the swing device does not rotate and the portable terminal is in a closed position.
Figure 10B:
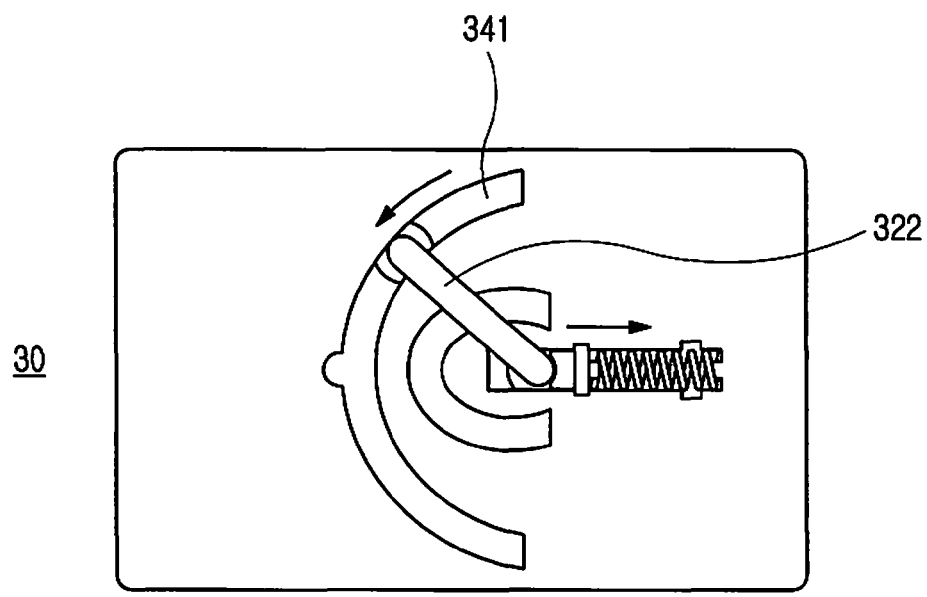
FIG. 10B is a view illustrating the operation of the swing device according to the present invention, in which the swing device rotates at an angle of 45 degrees from the closed position.

As shown in FIG. 10A, the first coupling member 320 is located at a near end 331 of the first guide portion 33 before the first swing operation, and the second coupling member 321 is positioned at a distal end 3411 of the first curved guide portion 341. The first and second coupling members 320 and 321 are subjected to the force of the driving source 36. FIG. 10B shows the second coupling member 321 of the second member 32 moving along the first curved guide portion 341.

Figure 10C:
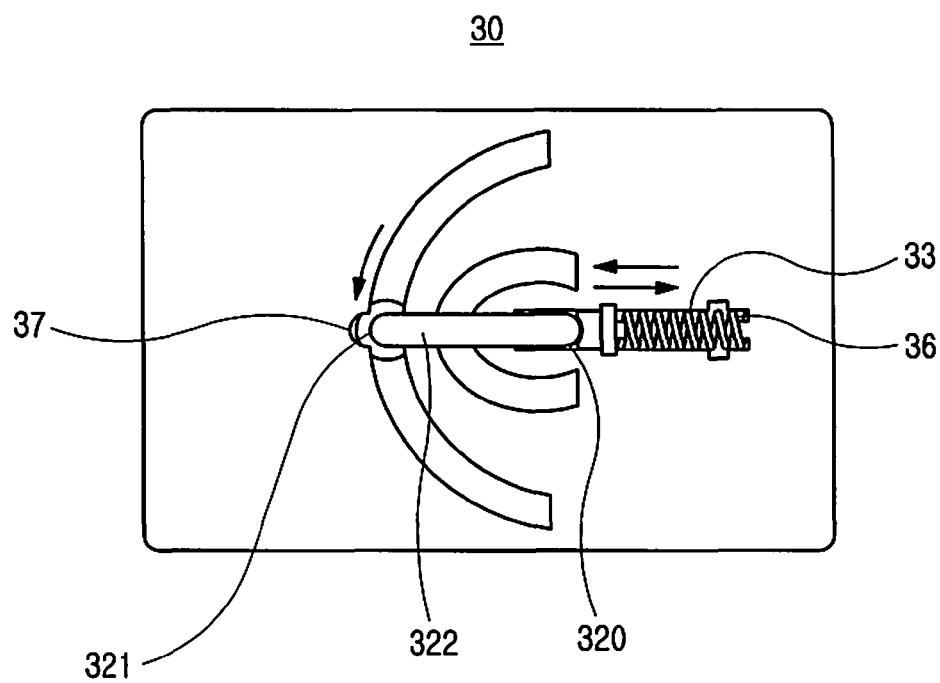
FIG. 10C is a view illustrating the operation of the swing device according to the present invention, in which the swing device rotates at an angle of 90 degrees, corresponding to FIG. 2.
Figure 10D:
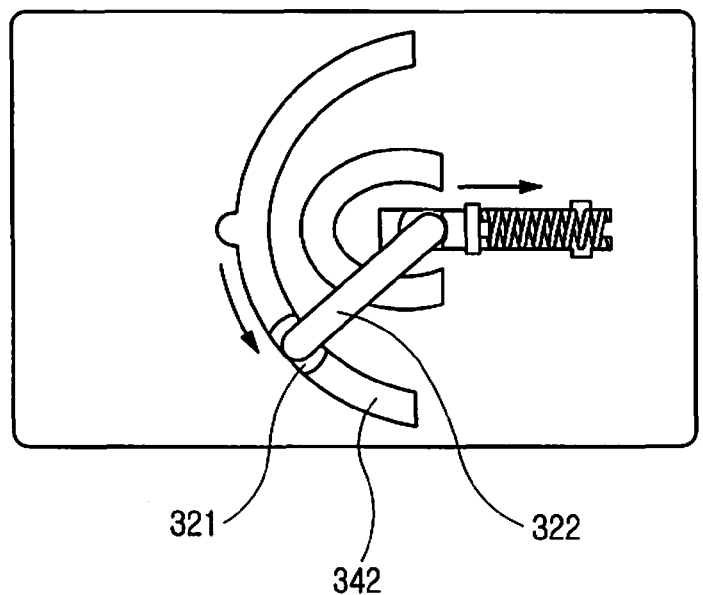
FIG. 10D is a view illustrating the operation of the swing device according to the present invention, in which the swing device rotates at an angle of 135 degrees.

As shown in FIG. 10C, after the first swing operation from the first position, the first coupling member 320 is located in the first guide portion 33 while the second coupling member 321 is positioned in front of the stop opening 37 and then is subjected to force which is applied by the driving source 36 to insert and keep the second coupling member 321 in the stop opening 37. FIG. 10D shows the second coupling member 321 of the second member 32 moving along the second curved guide 342.

Figure 10E:
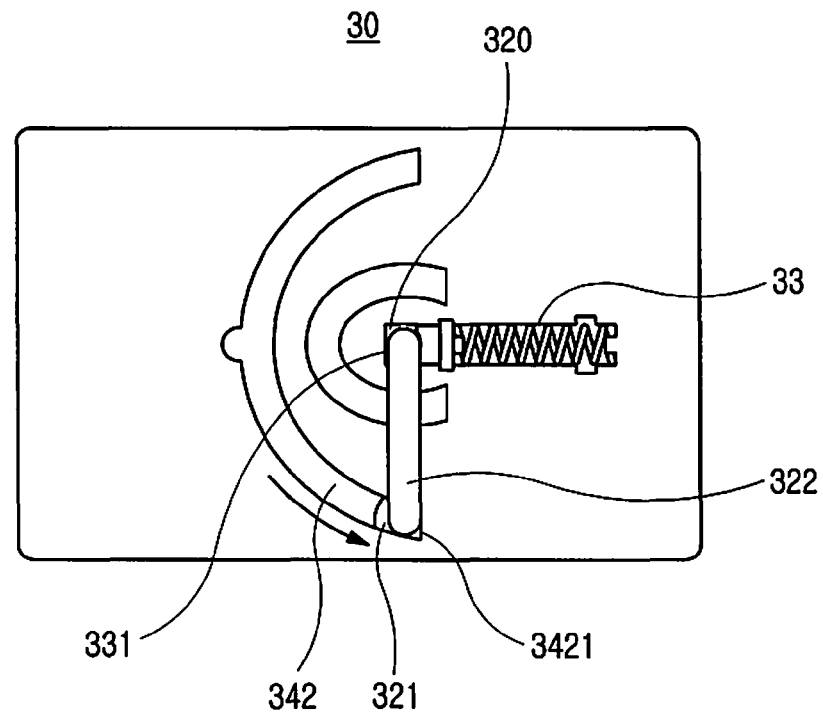
FIG. 10E is a view illustrating the operation of the swing device according to the present invention, in which the swing device rotates at an angle of 180 degrees, corresponding to FIG. 3.

As shown in FIG. 10E, after the second swing operation from the second position, the first coupling member 320 is located at the near end 331 of the first guide portion 33, while the second coupling member 321 is positioned at the distal end 3421 of the second curved guide portion 342 and is subjected to force which is applied by the driving source to keep the second coupling member 321 at the current position.

The first and second coupling members 310 and 312 extend through and are coupled with the first and second guide portions 320 and 330, so as to allow the second member 32 to swing. The second member 32 may be restricted by the first and second coupling members 320 and 321 to the first member 31, and be kept to face the first member 31.

For reference, the swing device of the portable terminal shown in FIG. 1 corresponds to the status of FIG. 10A, the swing device of the portable terminal shown in FIG. 2 corresponds to the status of FIG. 10C, and the swing device of the portable terminal shown in FIG. 3 corresponds to the status of FIG. 10E.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A semi-automatic swing device for a swing-type portable terminal having a body housing and a swing housing movably connected to the body housing, the semi automatic swing device comprising:
    a first member;
    a second member for semi-automatically performing first and second swing operations along a desired trajectory on the first member, while facing the first member;
    guide means having a first guide portion formed in the first member and a second guide portion formed in the first member and spaced apart from the first guide portion, for determining a direction of the first and second swing operations, wherein the first and second guide portions includes a first guide opening and a second guide opening, respectively, and wherein the first guide opening is linearly formed and the second guide opening is curvedly formed of a downwardly convex arc;
    a driving source installed in the first guide portion, for allowing the second member to semi-automatically perform the first and second swing operations; and
    first and second coupling members mounted on the second member and coupled with the first and second guide portions, respectively, the first and second coupling members moving along the first and second guide members and restricting the first and second members while the first and second members face each other, wherein the body housing of the portable terminal comprises the first member, and the swing housing comprises the second member.

2. The semi-automatic swing device as claimed in claim 1, wherein opening has a letter "C" shape.

3. The semi-automatic swing device as claimed in claim 2, wherein the second guide portion further comprises a stopper for stopping the first and second swing operations, the stopper including a stop opening formed at a midpoint of the second guide portion the stop opening receiving the second coupling member.

4. The semi-automatic swing device as claimed in claim 3, wherein the driving source applies force to the second coupling member in order to insert the second coupling member into the stop opening, and when the second coupling member is inserted in the stop opening, the driving source applies a stopping force that is greater than a driving force of the second coupling member during the first and second swing operations to the second coupling member, and the stopping force is less than an activating force which is manually applied to the second coupling member by a user in order to perform the first and second swing operations of the second member.

5. The semi-automatic swing device as claimed in claim 3, wherein the second guide portion includes a first curved guide portion for allowing the first swing operation, and a second curved guide portion for allowing the second swing operation, the first and second curved guide portions being formed to be symmetric to each other with respect to a longitudinal axis of the first guide portion.

6. The semi-automatic swing device as claimed in claim 5, wherein the first and second curved guide portions are formed such that a second distance from a near end of the first guide portion to a junction of the first and second curved guide openings is less than a first distance from the longitudinal axis to a distal end of one of the first and second curved guide openings.

7. The semi-automatic swing device as claimed in claim 5, wherein at a first position of the swing housing the driving source applies a first force to the first and second coupling members such that the first coupling member is located at a near end of the first guide portion while the second coupling member is positioned at a first end of the second guide portion, at a second position of the swing housing the driving source applies a second force to the first and second coupling members such that the first coupling member is located in the first guide portion while the second coupling member is received in the stop opening, and at a third position of the swing housing the driving source applies a third force to the first and second coupling member such that the first coupling member is located at the near end of the first guide portion while the second coupling member is positioned at a second end of the second curved guide portion.

8. The semi-automatic swing device as claimed in claim 1, wherein the driving source includes an elastic body installed in the first guide portion to supply elasticity force, and a movable member being coupled with the elastic body and reciprocating in the first guide portion, the movable member guiding a direction of the elasticity force, the movable member having a pair of guide protrusions and sliding in the first guide portion.

9. The semi-automatic swing device as claimed in claim 8, wherein the first guide portion has an assembling opening with a shape corresponding to that of the movable member, the movable member being installed in the first guide portion.

10. The semi-automatic swing device as claimed in claim 1, wherein the driving source is linearly mounted on the first member.

11. The semi-automatic swing device as claimed in claim 1, wherein the first member is an upper surface of the body housing, and the second member is a lower surface of the sliding housing.

12. The semi-automatic swing device as claimed in claim 1, wherein an auxiliary opening is formed between the first and second guide portions.

13. A semi-automatic swing device for a swing-type portable terminal, comprising:

a first member;

a second member for semi-automatically performing first and second swing operations along a desired trajectory on the first member;

a first and a second guide portions formed in the first member, for determining a direction of the first and second swing operations, wherein the first guide portion is linearly formed and the second guide portion is curvedly formed of a downwardly convex arc;

a first and a second coupling members mounted on the second member and coupled with the first and second guide portions, respectively, so as to restrict the first and second members to perform the first and second swing operations;

a driving source installed in the first guide portion while making close contact with the first coupling member, for rendering the first and second swing operations semi-automatic; and a linear connector for integrally connecting the first and second coupling members, wherein the linear connector is aligned perpendicularly to a longitudinal axis of the first guide portion at a first and third positions of the second member, and is in a longitudinal direction of the first guide member at a second position of the second member, the second position is between the first and third positions.

14. The semi-automatic swing device as claimed in claim 13, wherein rotation angle in each of the first and second swing operations is about 90 degrees, and a stopping operation is performed at the second position.

15. The semi-automatic swing device as claimed in claim 13, wherein the second guide portion includes a first curved guide portion for the first swing operation and a second curved guide portion for the second swing operation, the first and second curved guide portions being formed to be symmetric with respect to a longitudinal axis of the first guide portion.

* * * * *